(12) United States Patent
Kresnyak et al.

(10) Patent No.: US 6,355,145 B1
(45) Date of Patent: *Mar. 12, 2002

(54) DISTILLATION PROCESS WITH REDUCED FOULING

(75) Inventors: Steve Kresnyak; Minoo Razzaghi; Robert Spiering, all of Calgary (CA)

(73) Assignee: Aqua-Pure Ventures, Inc., Calgary (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/006,499

(22) Filed: Jan. 14, 1998

Related U.S. Application Data
(60) Provisional application No. 60/035,493, filed on Jan. 14, 1997.

(51) Int. Cl.⁷ .............................. B01D 3/42; B01D 1/28; C02F 1/04
(52) U.S. Cl. ............... 203/1; 203/2; 203/3; 203/10; 203/24; 203/26; 203/23; 203/27; 203/71; 203/98; 159/24.1; 159/44; 159/47.3; 159/901; 210/774
(58) Field of Search .................. 203/24, 26, 23, 203/27, DIG. 8, 98, 80, 2, 1, 10, 71, 3, 100; 202/182; 159/901, 24.1, 24.3, 28.6, 44, 47.3; 210/774

(56) References Cited

U.S. PATENT DOCUMENTS

| | | | |
|---|---|---|---|
| 4,054,493 A * | 10/1977 | Roller | 203/100 |
| 4,072,580 A | 2/1978 | Spörk et al. | 203/47 |
| 4,168,211 A * | 9/1979 | Pottharst, Jr. | 203/26 |
| 4,566,947 A * | 1/1986 | Tsuruta | 203/26 |
| 4,940,134 A | 7/1990 | Aoki et al. | 202/202 |
| 5,587,054 A * | 12/1996 | Keith | 159/28.6 |
| 5,597,453 A * | 1/1997 | Sears | 203/24 |
| 5,766,412 A * | 6/1998 | Railey | 159/47.3 |

FOREIGN PATENT DOCUMENTS

| | | | |
|---|---|---|---|
| DE | 4318936 C1 | 9/1994 | B01D/1/28 |
| EP | 0 520 793 A1 | 6/1992 | C02F/1/52 |
| EP | 0 524 825 A1 | 7/1992 | C02F/1/04 |
| EP | 0 740 119 A2 | 4/1996 | F25J/3/00 |
| FR | 2 482 979 | 5/1980 | C12F/1/02 |
| GB | 935178 | 8/1963 | |
| WO | WO98/31445 | 7/1998 | |

* cited by examiner

*Primary Examiner*—Virginia Manoharan
(74) *Attorney, Agent, or Firm*—Paul S. Sharpe; Marks & Clerk

(57) ABSTRACT

A method for removing a contaminant from a fluid feed stream containing the contaminant. The method includes the steps of providing a feed stream and heating it in a first step to at least partially remove some of the contaminants and recover energy from a concentrate and distillate generated. Further heating the feed stream in a second heating step in a heated separator generates a saturated vapor fraction and a concentrated liquid contaminant fraction. The vapor fraction may be compressed to generate a temperature differential in the reboiler exchanger with the vapor fraction being passed into contact with a reboiler exchanger to provide a stream of condensed vapor from the reboiler. The stream may be circulated through the reboiler exchanger and the heated separator to maintain from about 1% to about 50% by mass vapor in the stream. The apparatus includes a unique configuration of a vapor compressor, heated separator in combination with a forced circulation circuit to generate the decontamination result.

12 Claims, 8 Drawing Sheets

DISTILLATION PROCESS WITH REDUCED FOULING

This application claims benefit of provisional application Ser No. 60/035,493 filed Jan. 14, 1997.

FIELD OF THE INVENTION

The present invention is directed to a highly efficient water distillation process and an apparatus thereof and more particularly, the present invention is directed to a highly efficient water distillation process which minimizes fouling and scaling of operating equipment over long periods of operation.

BACKGROUND OF THE INVENTION

Generally speaking, water distillation is a highly effective method of vaporizing a pure water distillate and recovering a concentrated liquid containing a large quantity of non-volatile components. This process method can be an effective means to recover clean pure water from contaminated sources. However, water distillation processes typically have several problems not the least of which can be fouling or scaling of the apparatus with minerals or other components from the fluid being distilled. Common scaling compounds consist of calcium, magnesium and silicon. Fouling, or to a greater extent, scaling of the heat transfer surfaces have a detrimental effect on the capacity of the heat transfer components, causing conventional distillation processes to become inoperable.

Another common problem with typical water distillation processes is that the high energy input requirements. Without a means to effectively recover the input energy, the energy required is equivalent to the latent heat of vaporization of water at a given pressure/temperature. Water distillation, under this condition is not commercially viable for water remediation applications.

Several variables must be considered to overcome the problems with conventional distillation methods. The following three equations describe the basic heat transfer relationships within a water distillation system:

$$Q_{(total)} = U*A*LMTD \quad (1)$$

$$Q_{(sensible\ heat)} = m*CP*(T1-T2) \quad (2)$$

$$Q_{(latent\ heat)} = m*L \quad (3)$$

where

Q=quantity of heat transferred (BTU $hr^{-1}$)

U=overall heat transfer coefficient or ability of system to transfer heat (BTU $hr^{-1}$ $ft^{-2}$ $F^{-1}$)

A=heat transfer surface area ($ft^2$)

LMTD=log mean temperature difference or the thermal drive of the system (F)

m=mass flow of fluid in liquid or vapor state (Ib $hr^{-1}$)

Cp=fluid specific heat (BTU $hr^{-1}$ $F^{-1}$)

T1,T2=temperature of fluid entering or exiting system (F)

L=latent heat of vaporization or condensation (BTU $Ib^{-1}$)

In order to have an efficient distillation system, the quantity of heat exchanged and recovered, Q, expressed by the above stated equations, must be maximized, while at the same time obeying the practical limits for the remaining variables and preventing scaling and fouling. For a given fluid and fluid dynamics within a given heat exchange apparatus, the variables, U, Cp and L are relatively non-variable. Therefore, careful consideration must be given to the variables A, Q/A, LMTD, m, and T1 & T2 to overcome the problems associated with distillation of contaminated water.

To fully overcome the problems related to distilling contaminated water and eliminate scaling, other essential factors must be considered beyond the basic equations stated above:

the rate by which the heat is transferred within the distillation system, known as heat flux or $QA^{-1}$ (Btu $hr^{-1}$ $ft^{-2}$)

the level of contaminates in the concentrate;

the final boiling point of the concentrate relative to the saturation temperature of the vapor stream;

the degree of supersaturation and level of precipitation of the concentrate; and level of vaporization of the evaporating stream.

Until the advent of the present invention, maximizing the quantity of heat transferred and recovered with a water distillation process, without the tendency of fouling or scaling, could not be realized over a long term continuous period.

A process has been developed which is both energy efficient and eliminates the problems of scaling previously encountered in the distillation of contaminated water, contaminated with organics, inorganics, metals, inter alia.

SUMMARY OF THE INVENTION

The invention is predicated upon the marriage of two distinct concepts, both of which have been previously identified singularly in the prior art but which have not been uniquely configured with the synergistic effect that results with the present invention. It has been found by employing a conventional vapor recompression circuit together with a uniquely configured forced convection heat recovery and transfer circuit, that very desirable results can be obtained in terms of maximizing heat transfer and maintaining the desired forced convection circuit non-conductive to scaling exchangers, which is typically encountered by practicing standard distillation methods.

One object of the present invention is to provide an improved efficient process for distilling water containing organic, inorganic, metals or other contaminant compounds with the result being a purified water fraction devoid of the contaminants which additionally does not involve any scaling of the distillation apparatus.

A further object of the present invention is to provide a method of removing a contaminant from a water feed stream containing the contaminant, comprising the steps of:

a) providing a feed stream;

b) heating the feed stream in a first step to at least partially remove some of said contaminants from the feed stream and recover energy from a concentrate and distillate;

c) heating the feed stream in a second heating step in a heated separator to generate a vapor fraction and a concentrate liquid contaminant fraction;

d) compressing the vapor fraction to generate a temperature differential in reboiler exchanger;

e) passing the vapor fraction into contact with the reboiler exchanger to provide a condensed distillate from the reboiler;

f) circulating at least a portion of the concentrate through the reboiler exchanger and the heated separator to maintain a ratio of circulating mass to vapor mass of about 300 to about near 2; and g) collecting the condensed distillate substantially devoid of contaminants It has been found that by precisely controlling the ratio of circulating mass in a range of less than 300 to near 2 times that of the vapor fraction being compressed, several desirable advantages can be realized:

1. The circulating concentrate through the evaporating side of the reboiler will contain a precisely controlled vapor fraction near 1% to 50% of the mass of the circulating concentrate;
2. By precisely controlling this vapor fraction, the temperature rise of the circulating concentrate remains very low (about 1F.) and cold heat exchange surfaces remain wetted, at a temperature near that of the circulating fluid. This reduces the risk of fouling of these surfaces;
3. With this controlled low vapor fraction, the concentrated fluid within the exchanger is subjected to an additional localized concentration factor of less than 1.1, avoiding localized precipitation of scaling compounds;
4. As the vapor fraction increases and the concentration factor increases while passing through the reboiler, the stream velocities increase significantly thus reducing the risk of fouling;
5. By allowing a controlled vapor fraction in the evaporating fluid, significant heat transfer can be realized through the means of latent heat, without scaling;
6. Because the temperature rise of the evaporating side of the reboiler is kept very low, the LMTD of the reboiler is maintained, thereby keeping the compression energy very low; and
7. By adjusting the heat flux, the temperature of the wet surfaces for condensing and evaporating are maintained near that of the saturated steam condition. The type of boiling experienced will range from primarily forced convection to stable nucleate boiling of the wetted surfaces.

One object of the present invention is to provide a method for removing contaminants from a feed stream containing contaminants by employing a heated separator and a heat exchanger and preventing the fouling of and formation of scale on said separator and said heat exchanger, comprising:

a) generating a vapor fraction from the heated separator substantially devoid of contaminants and a separate concentrated contaminants fraction:
b) compressing the vapor fraction to elevate the temperature of the fraction beyond that of the heated separator;
c) passing the vapor fraction into contact with the heat exchanger to form a condensed distillate; and
d) maintaining heating surfaces of the separator and exchanger at least in contact with the concentrated contaminants fraction by continuously circulating the fraction through the separator and the heat exchanger in a ratio of circulating mass to vapor mass of about 300 to near 2 whereby scale formation and fouling of the heating surfaces is prevented.

A further object of the present invention is to provide a method of removing contaminants from a fluid feed stream containing volatilizable and nonvolatilizable contaminants, comprising the steps of:

a) providing a feed stream;
b) heating the feed stream in a first step to at least partially remove some of the contaminants from the feed stream and recover energy from a concentrate and distillate;

c) heating the feed stream in a second heating step in a heated separator to generate a vapor fraction and a concentrate liquid contaminant fraction;
d) passing the vapor fraction through a distillation column while in contact with distillate reflux;
e) compressing the vapor fraction to generate a temperature differential in the reboiler exchanger;
f) passing the vapor fraction into contact with a reboiler exchanger to provide a condensed distillate from the reboiler exchanger;
g) recirculating a portion of the condensed distillate to the distillation column as distillate reflux;
h) circulating at least a portion of said concentrate through the reboiler exchanger and the heated separator to maintain a ratio of circulating mass to vapor mass of about 300 to about near 2; and
i) collecting the condensed distillate substantially devoid of the contaminants With respect to the apparatus, a still further object of the present invention is to provide a fluid treatment apparatus for treating a feed stream containing at least one contaminant to produce an effluent free of said at least one contaminant, comprising, in combination:

vapor recompression means including a first heating means for heating the feed stream;
heated separator means in fluid communication with the first heating means for forming a vapor fraction and a concentrated fraction;
compressor means for compressing the vapor fraction;
heat exchanger means in fluid communication with the compressor means for recovering latent heat from condensed vapor; and
a forced circulation circuit including:
  a pump means;
  heat exchanger means, the pump means in fluid communication between the heated separator means and the exchanger means;
  fluid communication means between the heat exchanger means and the heated separator means forming a forced circulation circuit;
  the pump means for selectively varying a circulation rate of the fluid through the exchanger means for selectively varying the quantity of vapor fraction through the exchanger means.

Broadly, in one possible embodiment, distilled water is evaporated and passed through a mesh pad to remove any entrained water before entering the compressor. The compressor elevates the pressure and temperature of the vapor stream above that of the heated separator to allow effective heat transfer across the reboiler heat exchanger. The vapor stream subsequently enters the reboiler where it is "desuperheated" and condensed to distillate. The heat energy is transferred to the circulating concentrate from the heated separator where, by way of controlling the mass of circulating concentrate to vapor stream, to a range of less than 300 to near 2, less than 50% vapor, more precisely less than 10%, vapor is generated in the circulating concentrate stream. This vapor phase absorbs the transferred heat by latent heat of vaporization, while at the same time not allowing the temperature on the circulating concentrate to increase greater than about 1F. The clean distillate water at condensing temperature and pressure, passes through the preheater to recover the sensible heat portion of the system to the incoming feed stream. Simultaneously, a portion of the concentrate stream is removed from the heated separator to control the desired concentration of contaminants. This concentrate blowdown stream at the heated separator temperature and pressure, is passed through an additional preheater to impart the remaining sensible heat energy to the feed stream. Additional pre and post-treatment techniques can be employed as batch or continuous process methods to remove or contain contaminants during the distillation operation, pH control methods can be used to ionize volatile components or alter solubility conditions in the concentrate to further enhance the subject distillation process.

The distillate water recovered can be controlled to purity level and temperature level which allows it to be reused as process water, reused as distilled water or released to nature water sheds meeting or exceeding virtually all environmental water quality standards.

In terms of the breadth for this process, the same could be easily employed to decontaminate industrial processed water such as that in the refinery, petrochemical, pulp and paper, food, mining, automotive/other transportation industries and the manufacturing industries. In addition, applications are envisioned for landfill leachate water, desalination, ground water remediation, well water cleanup, lagoon remediation, oil field waste water recovery, as well as producing any form of boiler feed water, and concentrating valuable components from dilute streams. This listing is by no means exhaustive, but rather exemplary.

Having thus described the invention, reference will now be made to the accompanying drawings illustrating the preferred embodiments.

BRIEF DESCRIPTION OF THE DRAWINGS

Similar numerals employed in the text denote similar elements.

DETAILED DESCRIPTION OF THE PREFERRED EMBODIMENTS

Figure 1:
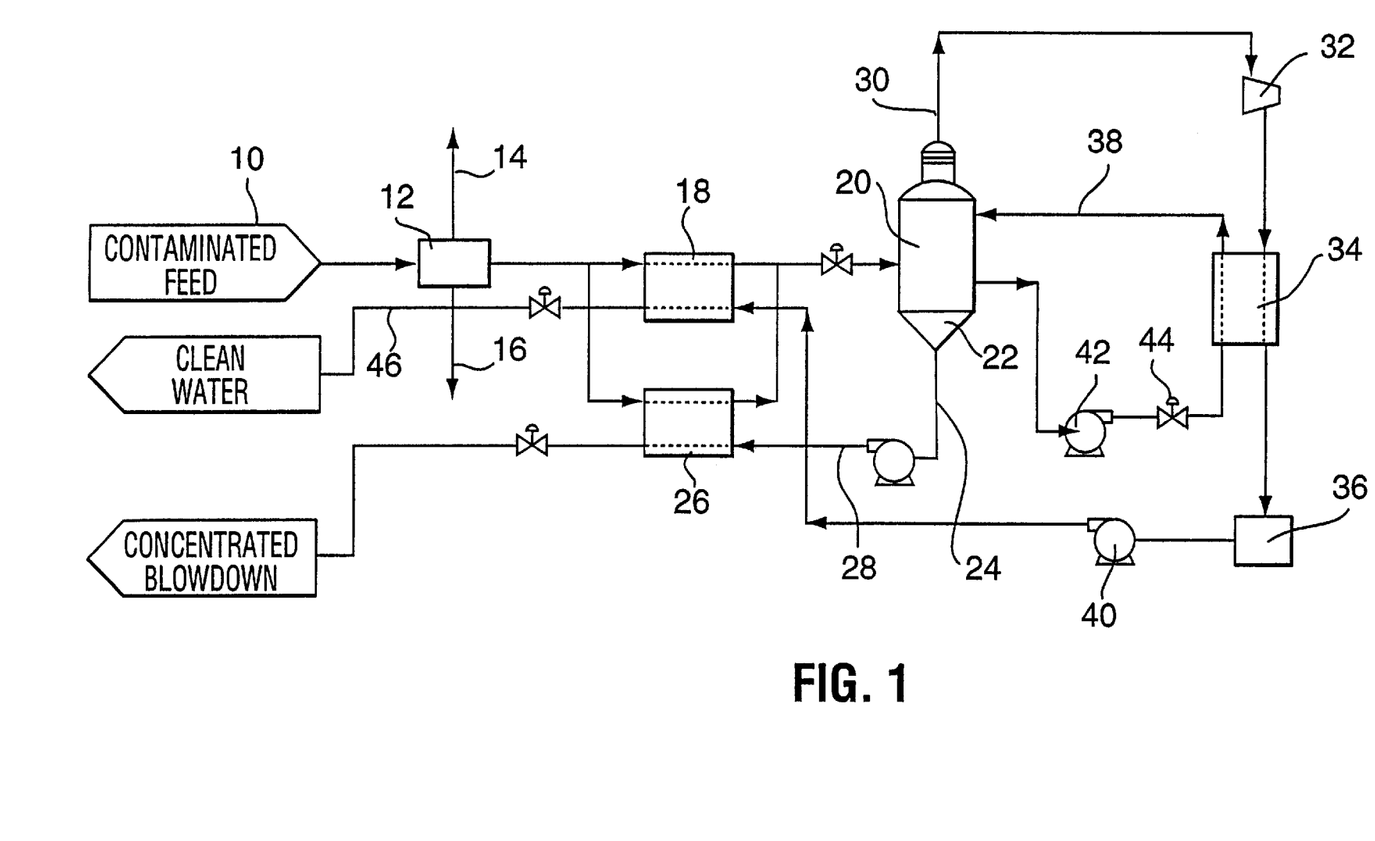
FIG. 1 is a schematic illustration of the overall process according to one embodiment of the described invention.

Referring now to FIG. 1, shown is an example of one embodiment of the present invention.

A contaminated water feed stream, generally denoted by numeral 10 is introduced into a pretreatment step, generally denoted by 12 for removing insolubles, volatiles and/or performing other pH or conditioning steps for preparing the feed stream 10. Volatile components are vented from the feed stream at 14, while less volatile components are discharged from the feed stream at 16. The pretreated feed stream exiting 12 is then passed into a preheater 18 to elevate the temperature of the feed stream to enhance sensible heat recovery prior to introduction into a heated separator 20. The feed stream may be split into multiple streams and passed through other secondary sensible heat secondary sensible heat recovery preheaters to maximize the full recovery potential of the unit. Such arrangements will be appreciated by those skilled in the art. The multiple preheaters may be configured as a single multi-service preheater or separate units as denoted by 18 and 22. The separate feed streams are recombined and heated to near heated separator temperatures, prior to entering the heated separator 20. If desired, the feed stream can also be introduced into the forced circulation stream to create a local dilution effect in the reboiler. The heated separator may comprise a multiple separation unit, such as a cyclonic separator. The lower section, broadly denoted by numeral 22, has cyclonic action to suspend solid material in the concentrate and discharge what is referred to as "blowdown" or concentrate as denoted by line 24. The rate of blowdown 24, continuous or batch, controls the concentration of components in the heated separator 20, thereby regulating the degree of saturation of the concentrate, the degree of supersaturation, subsequent precipitation of solids and the boiling temperature in the heated separator 20. The blowdown 24, at heated separator 20 temperature is passed through the secondary preheater 26 for heat recovery to the feed stream via line 28. The blowdown stream 24 is reduced to a temperature within about 3 F. to approach to the feed stream at 22.

The upper section of heated separator 20, containing mostly saturated steam vapor, is dedicated to vapor/liquid separation and may contain such features as a mesh pad (not shown) to coalesce liquid droplets from the vapor stream. Vapour exiting the heated separator 20 and generally indicated by line 30 constitutes environmental quality distillate and depending on the components present in the feed stream, may comprise potable water or boiler quality feed water. The vapor is transferred into the compressor 32 to elevate the pressure and temperature of the vapor stream above that of the heated separator 20. The vapor stream can be at any pressure leaving the heated separator, including vacuum. This vapor is primarily saturated at the heated separator 20 conditions, however it can become supersaturated if the concentrate contains components at a sufficient concentration to increase the boiling point of the vapor. This concept is known as boiling point rise or BPR and shall be understood so that the compression can be appropriately compensated. The additional energy imparted to the vapor stream sets up the required LMTD or thermal drive necessary to effect heat transfer in the reboiler heat exchanger, generally denoted by numeral 34.

The compressor or blower, denoted by numeral 32 may be any device known to those skilled in the art which can induce about 3 to 10 psi head into the vapor and flow the desired level of vapor mass. The actual head required from the compressor 32 is specifically determined for each unit by the evaporating conditions in the heated separator 20 and the required LMTD for the reboiler 34. The vapor leaving the compressor 32 is primarily superheated steam. The degree of superheat is dependant on the discharge pressure, and efficiency of the compressor device 32.

The reboiler exchanger 34 functions to condense the compressed vapor received from compressor 32 to distillate draining from the reboiler 34 through a condensate receiver, denoted by numeral 36. This step captures the superheat and latent heat of the vapor stream and accepts it by means of thermal drive into the concentrate circulating stream denoted by numeral 38. The distillate accummulated in the receiver 36 generally is saturated liquid at a specific temperature and pressure condition. The additional sensible heat contained in the distillate is recovered by passing hot distillate using pump 40 back through the preheater 18, where the exiting stream is cooled to about 3 F. within the incoming feed stream from 12.

It has been found that by using it a concentrate circulation pump 42 to circulate a prescribed quantity of concentrate from the heated separator 20, through the reboiler exchanger 34, that significant results can be realized without the risk of fouling or scaling of the exchanger surfaces. The quantity of circulating concentrate mass is specifically selected to be in a range of less than 300 to at near 2, thereby precisely generating a vapor fraction of near 1% to less than 50% in the stream 38 exiting the reboiler exchanger 34. This mass flow can be varied and set at the desired parameter by using a control device generally denoted by numeral 44. More specifically, the desired target for vapor fraction in the exiting circulating stream 38, when considering most contaminated feed streams, is less than 10% vapor fraction. The vapor generated in the stream 38 is equivalent in mass to the amount passed through the compressor and recovered as distillate at 46. The vapor created in the reboiler exchanger 34, even though it is very small in mass fraction (about 1 to 10% of the circulating mass), absorbs the majority of heat transferred from the condensing side of the reboiler 34. The selection of vapor fraction and concentrate circulation rate is an important factor in reducing fouling and scaling. To a greater extent, this parameter is most important to establish a very low temperature rise on the concentrate circulating fluid to maintain an effective LMTD without a temperature cross in the reboiler exchanger 34. Any temperature rise will quickly eliminate the LMTD and heat transfer will stop. For example, if the pressure of the circulating concentrate were increased in the reboiler such that the fluid could not create some vapor, the temperature would rise by sensible heat absorption until no LMTD would exist and thus the heat transfer would decline. The back-pressure of the concentrate circulating system, consisting of static and friction head losses, is designed to be minimal. In fact, the back pressure is primarily equal to the static head loss of the vertical exchanger, as the dynamic pressure drop of the exchanger is minimized. The circulating concentrate flow is then selected to achieve near 1% to 10% vapor friction in the outlet line 38. The resulting temperature rise is very low and the LMTD remains at its design value.

Figure 2:
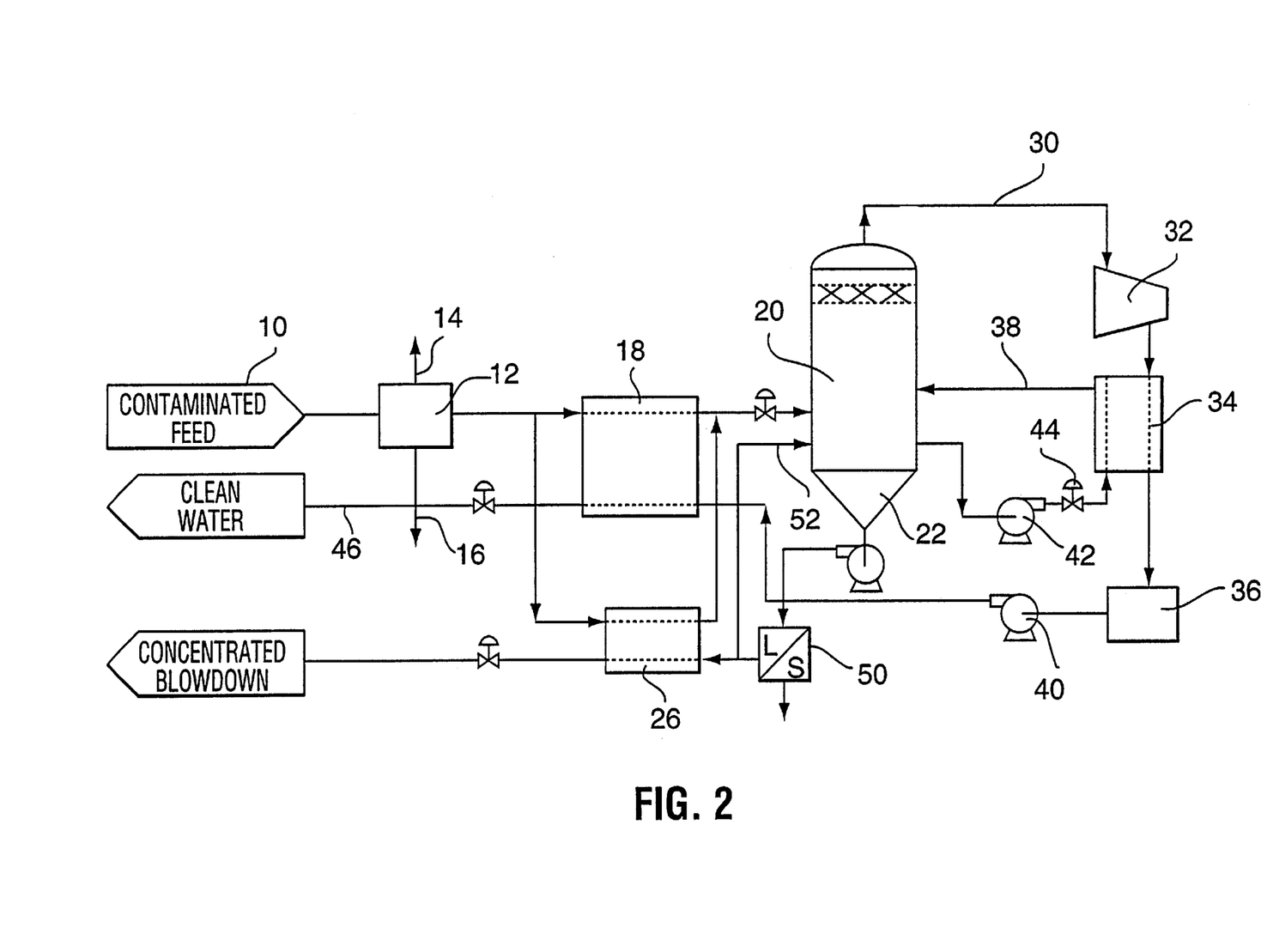
FIG. 2 is an alternate embodiment of FIG. 1.

Referring now to FIG. 2, shown is an alternate process scheme which allows for blowdown 24 from the heated separator 20 to be adjusted until the overall concentration effect or concentration factor (CF) of the system creates a supersaturated concentrate with respect to one or many components to cause precipitation. As the solids form and build in the heated separator 20, the blowdown 24 is passed through a solid/liquid separation device, generally denoted by numeral 50 for removal of the solids or sludge. As an alternative, the solid/liquid separation device 50 can be located between the reboiler pump 42 and the exchanger 34, in a slipstream or total flow arrangement. The recovered liquid is further recycled back to the heated separator 20 as indicated by 52 and a portion representing the blowdown quantity, is further passed through the preheater 26 for heat recovery and cooled to about 3 F. The solid/liquid separation device 50 can be of any form such as hydrocyclone, centrifugal settler, gravity settler, centrifuge, decanting separator, known to those skilled in the art. This process is particularly attractive when the major objective is to recover a compound as a solid or when the compound is of significant commercial value.

Figure 3:
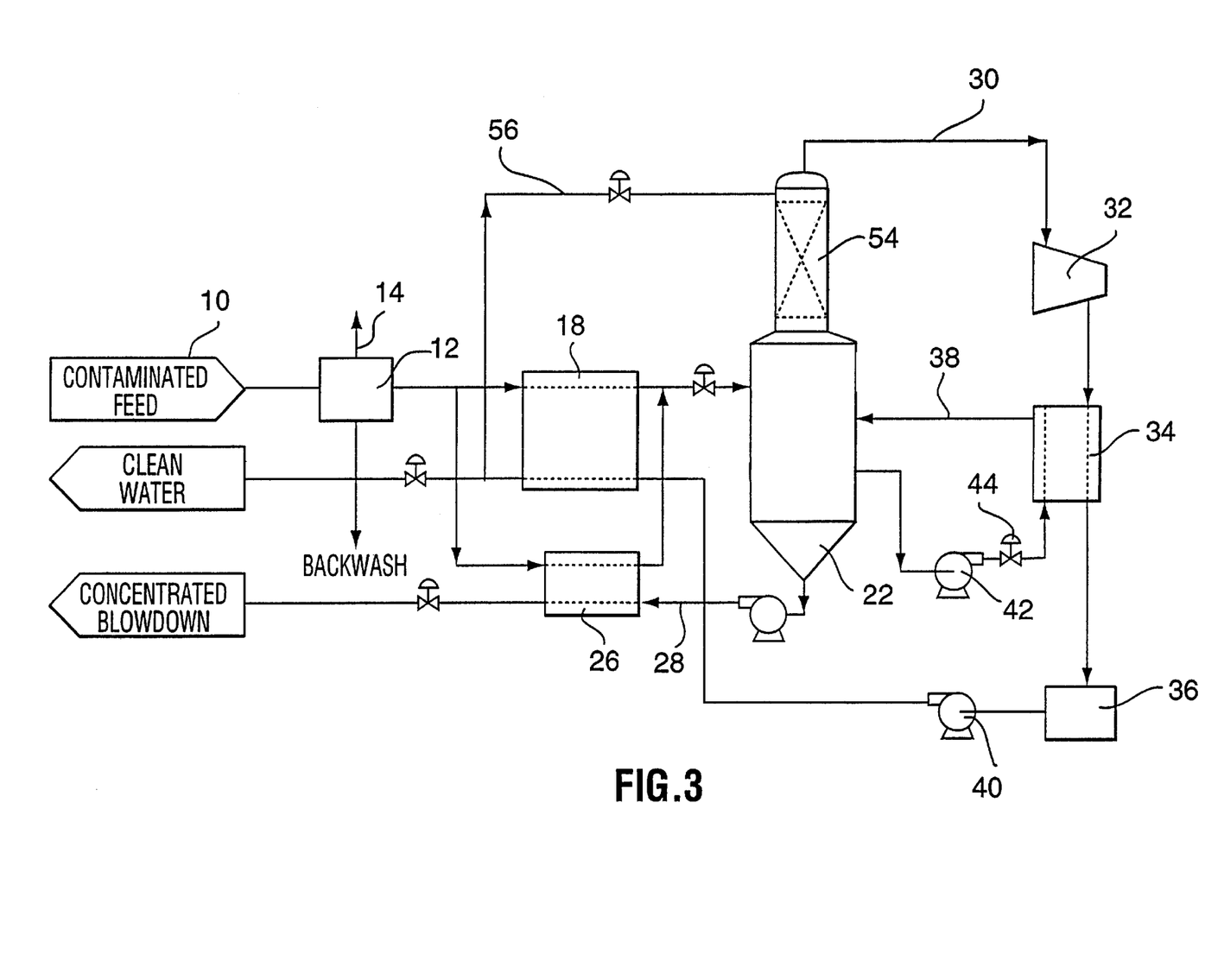
FIG. 3 is a further alternate embodiment of FIG. 1.

Referring further to FIG. 3, shown is a further process variation by which the vapor stream may contain a portion of a particular contaminant from the feed stream. The heated separator 20 is equipped with a fractionation column 54 ahead of the compressor 32 and compressor suction line 30. The column 54 is used to fractionate and scrub out the contaminate using multiple stages in conjunction with clean cool water reflux, denoted by numeral 56. The reflux can be drawn from either upstream or downstream of the preheater 18 or a combination, depending on the required reflux temperature. This process variation is attractive when the feed steam contains, for example, volatiles such as hydrocarbons, glycols, ammonia, etc.

Figure 4:
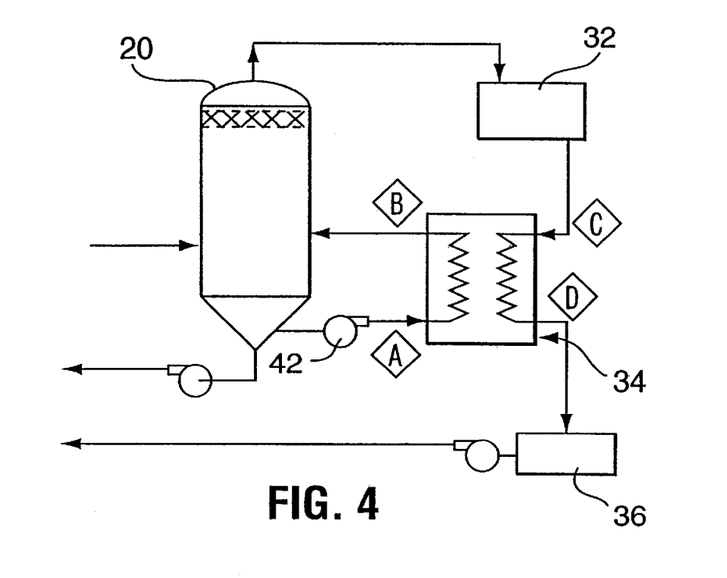
FIG. 4 illustrates, in a schematic form, the typical pressure and temperature conditions around the evaporation components.
Figure 5:
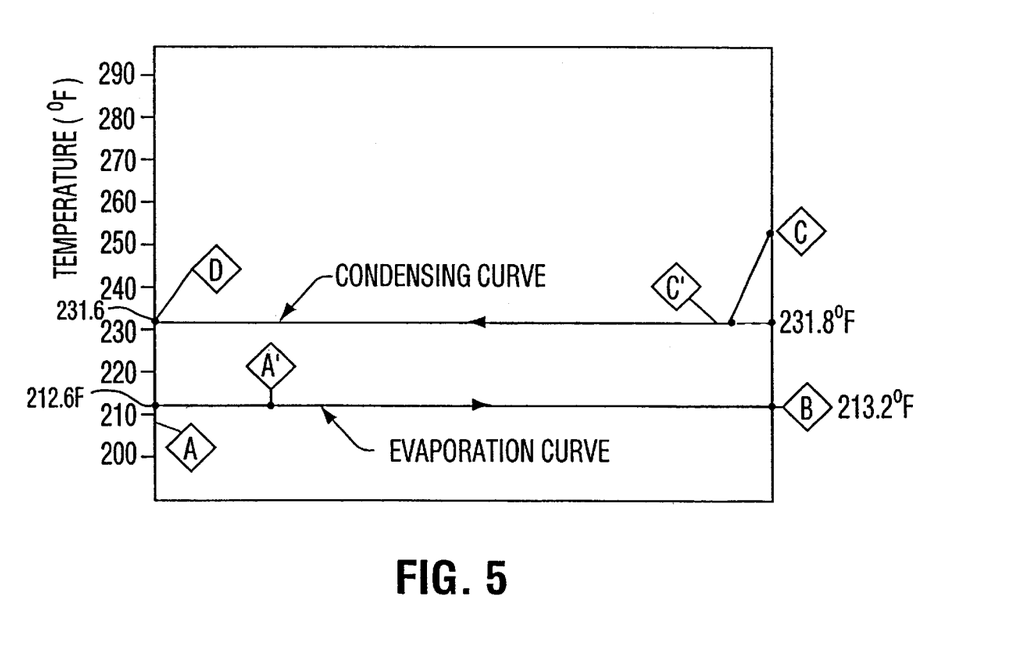
FIG. 5 is a process condensing/evaporating curve for the system reboiler exchanger.

FIG. 4 illustrates the typical pressure and temperature relationships of the various streams around the evaporation portion of the process. Numerical references are made from FIGS. 1 through 3 for this discussion. Although the specific process parameters are shown by way of example, they are modifiable to suit any specific distillation application. This schematic shows the conditions based on a fluid with no boiling point rise and the heated separator 20 operating at slightly above atmospheric pressure, 16 psia and 212.5 F. The circulating concentrate temperature rise is less than 1 F. for a reboiler pressure drop of 2.5 psi. The vapor fraction of the circulating stream is about 10%. The conditions around the reboiler exchanger 34 can be represented on a evaporation/condensing curve as shown in FIG. 5. On the condensing side of the exchanger, superheated steam enters at point C 0 at about 231.8 F. and 21.4 psia and is condensed at the saturated pressure of the vapor at point C, at about 231.8 F. and 21.4 psia. This zone is commonly referred to as the desuperheating zone and consists of about 2% of the exchanger surface area, the remaining zone being the area by which the latent heat of condensation is released. A slight drop in pressure and temperature will occur through the exchanger 34 due to the inherent pressure drop of the heat exchanger. The outlet conditions become about 231.8 F. and 21.4 psia. The surface temperature, on the condensing side, will be less than the saturation temperature of the incoming vapor, thereby forming a condensate film on the heat exchange surface. The heat transfer will therefore occur off the wet wall condition maintaining the effective temperature of the film at the vapor saturation temperature. The distillate will drain from the exchanger to the condenser receiver 36 at point D, keeping the reboiler free of liquid and exposing all of the heat exchanger surface to the condensing process.

On the evaporating side, concentrate enters the exchanger countercurrently from the bottom at point A at about 212.5 F. and 18.06 psia after the circulating pump 42. The circulation rate is adjusted so that the ratio of concentrate mass is at least 10 times greater than the vapor rate. The temperature of the concentrate fluid begins to rise to point A', and then levels off to about 213.2 F. as point B is reached, where the static head is overcome and the pressure reduces to 16.1 psia. While the concentrate rises up the exchanger 34, vapor begins to form by forced convection, absorbing the latent heat transferred. By increasing the fluid mass on the evaporating side until the ratio of circulating mass to vapor mass falls within the desired range, the boiling effect is controlled within the forced convection and stable nucleate boiling regions. Because of the high mass flow of liquid, the heat transfer surface remains wetted at a temperature equivalent to the saturated temperature of the newly formed vapor. By further ensuring that the flux rate ($QA^{-1}$) for a exchanger is below 6000 BTU $hr^{-1}$ $ft^{-2}$, the temperature rise for the evaporating side can be maintained below 1 F. and the wetted film surface is maintained, thereby eliminating the risk of scaling. If the flux rate is too high, the instantaneous vapor acceleration pressure drop temporarily exceeds the available static head, resulting in unstable temporary backflow and possible breakdown of the wetted heat transfer surface. This may result in fouling of the heat transfer surface. Below heat fluxes of 6000 BTU $hr^{-1}$ $ft^{-2}$ and within the range of circulating concentrate mass to vapor mass less than 300, there exists a region where the liquid and vapor can co-exist in stable operation and maintain a fully wetted heat transfer surface on the evaporating side of the reboiler, without the risk of fouling or scaling.

Figure 6:
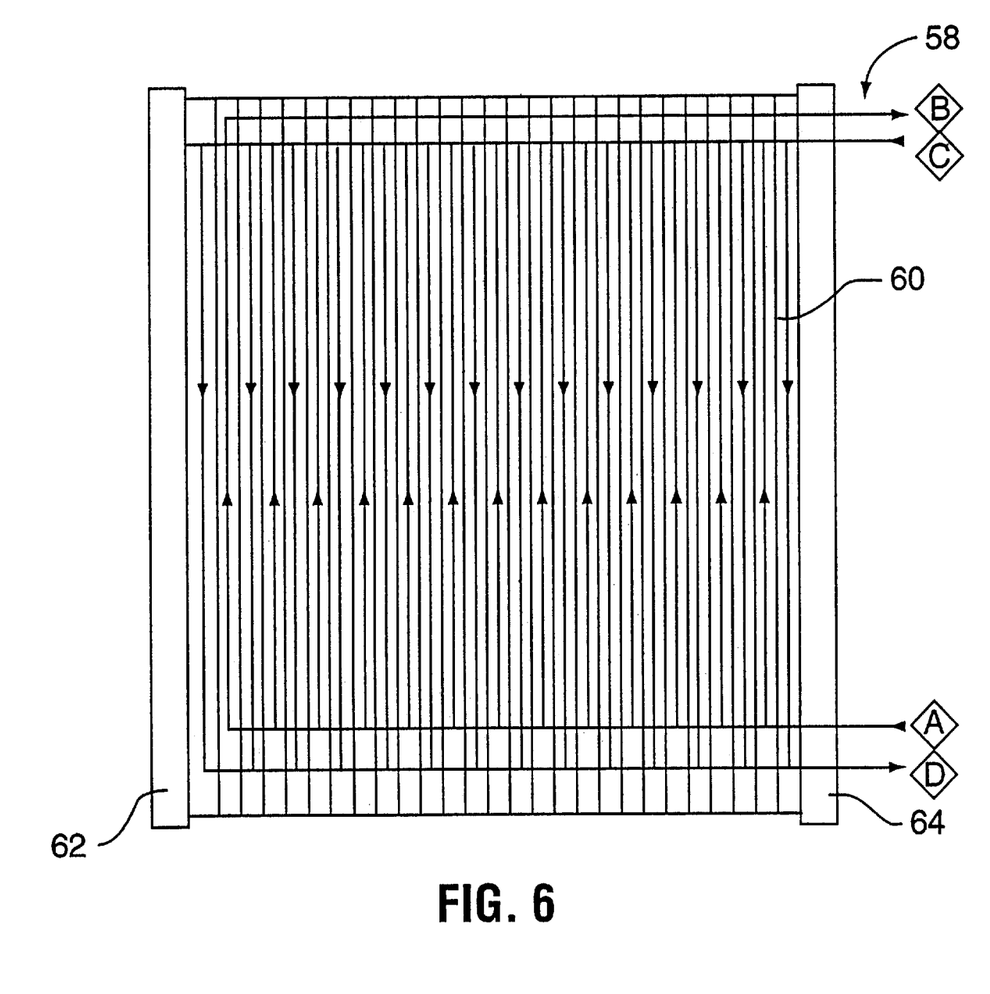
FIG. 6 illustrates the schematic of the flow pattern for the reboiler plate/plate heat exchanger.

Reference to points A through D is also found on FIG. 6.

FIG. 6 illustrates the elevation view of a highly efficient heat transfer exchanger 58, known by those skilled in the art as a plate and frame heat exchanger, whereby rows of vertically stacked, gasketed plates 60 are arranged between two solid frames 62 and 64. These devices are well known for their compact size and ability to have very high U values or overall heat transfer coefficients. This type of exchanger, arranged as a single pass, countercurrent flow configuration is well suited for the present invention and specifically offers the following benefits to perform the present invention:

1. The plate type exchanger offers a low, fixed static head and very low pressure drop on the concentrate circulating fluid or evaporating side, while providing a relatively high heat transfer coefficient;
2. The heat flux can be easily adjusted by adding more surface area or plates in a given frame;
3. The condensing side of a plate frame design is free draining and has low pressure drop, while maintaining a relatively high heat transfer coefficient;
4. The highly effective heat transfer coefficient allows the surface temperatures to be very near to both fluid stream temperatures reducing the risk of fouling;
5. The high turbulence and equivalent high fluid velocities results in low fouling and maintains the solids in homogeneous suspension as they pass through the exchanger;
6. There are no hot or cold spots and no dead flow regions inherent to a plate frame design lowering the risk of fouling or scaling;
7. Plates are smooth and well finished reducing the risk of fouling; and
8. Low fluid residence time reduces the risk of precipitation, as there is insufficient time to reach equilibrium and generate scaling contaminants.

More generically, the plate type heat exchanger is very compact and can be provided cost effectively with exotic alloy plates to resist fluid corrosion and stress corrosion cracking, common to desalination type applications. Other types of exchangers, shell and tube, double pipe, finned tube, spiral type, may also be considered by those skilled in the art, provided the specific requirements of the invention are maintained.

Figure 7:
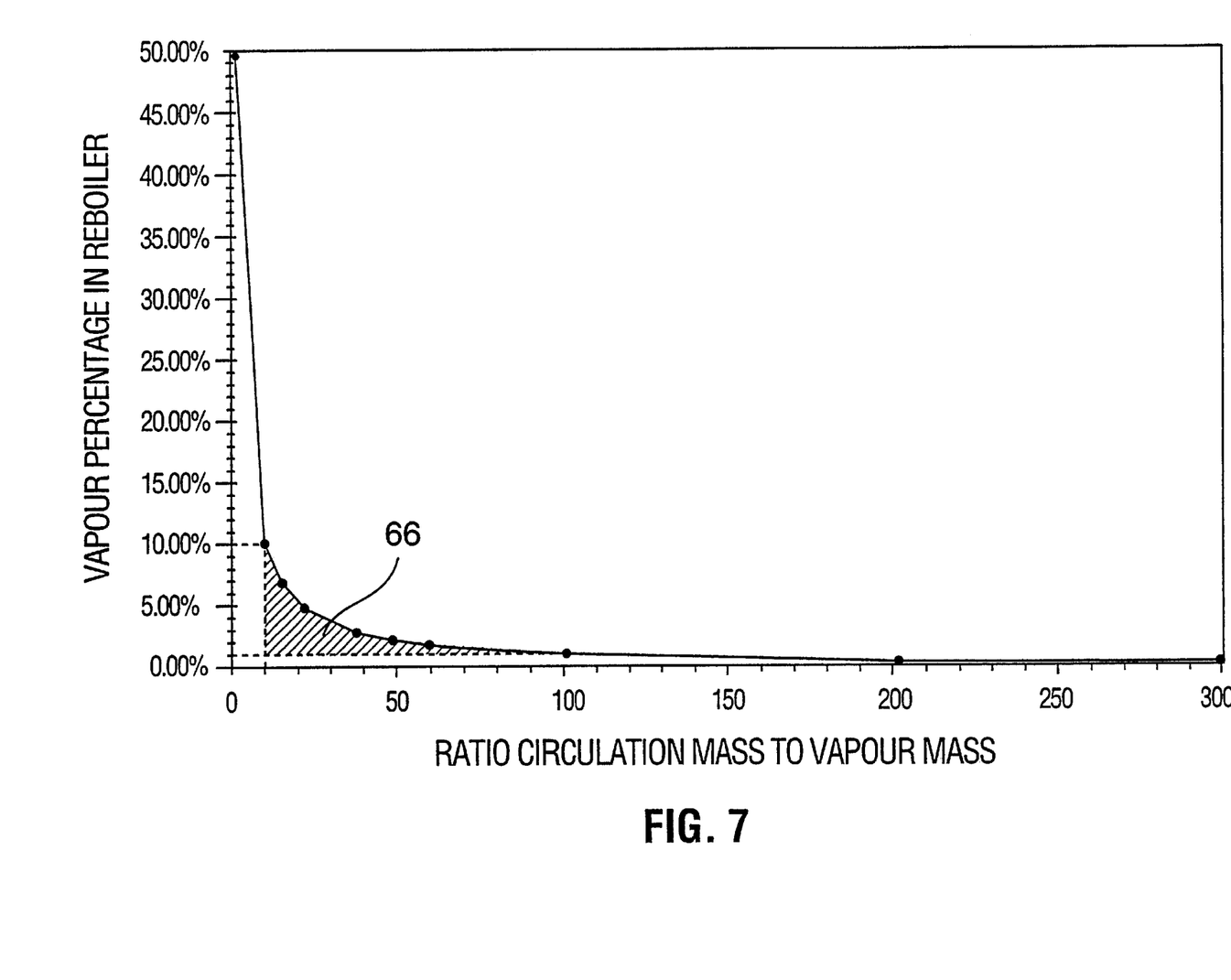
FIG. 7 is a chart illustrating the level of vaporization in the reboiler, occurring in the circulating fluid with relation to the ratio of circulating fluid mass to vapor mass.

FIG. 7 is a chart showing the preferred design range, globally denoted by 66, for the ratio of circulating concentrate mass flow in relation to the vapor mass flow. The desired range from about 10 to 100 results in a vapor fraction of less than 10% to near 1%.

Figure 8:
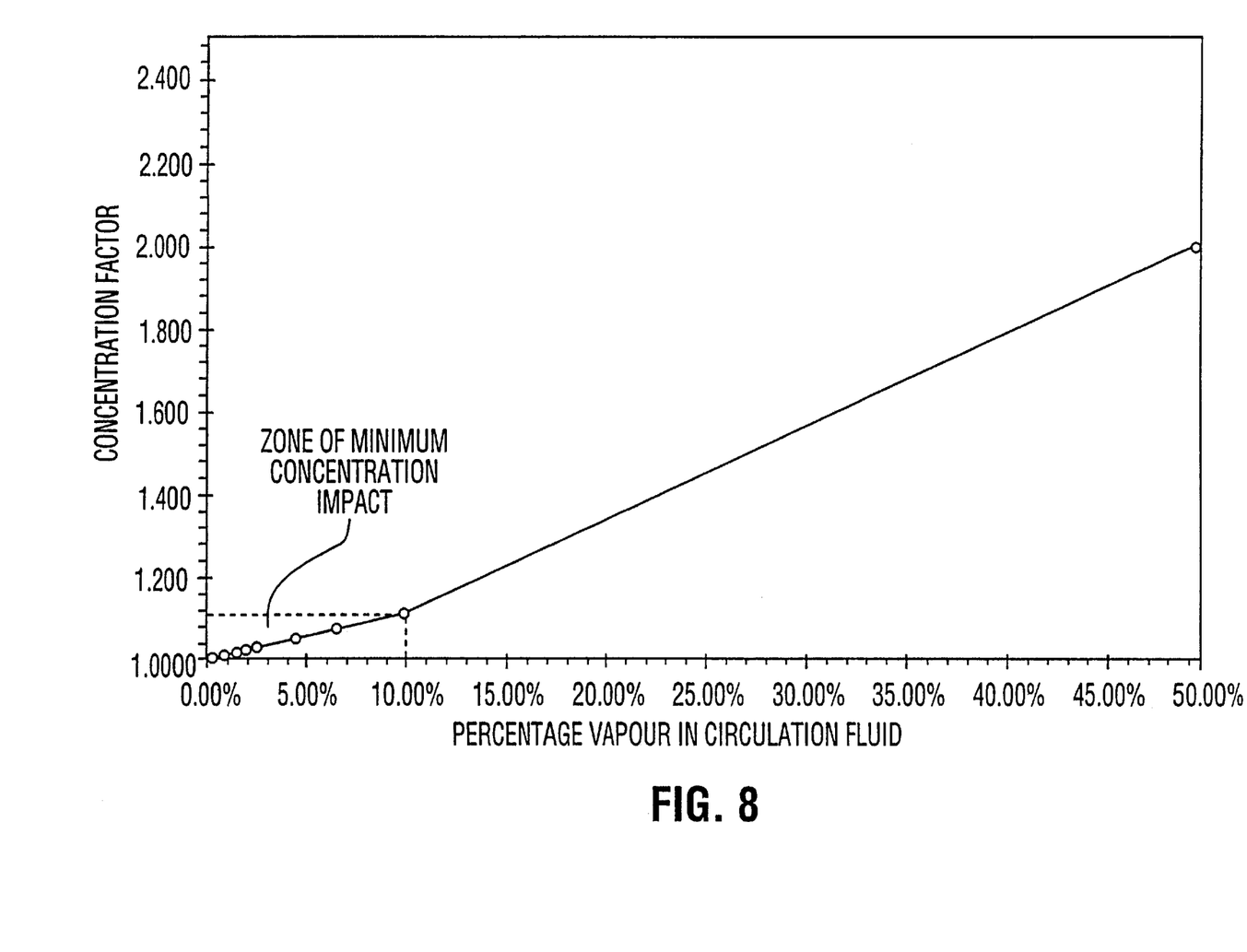
FIG. 8 is a chart illustrating the resulting localized concentration effect in the reboiler with varying vapor fractions.

FIG. 8 is a chart showing the resulting impact on the local concentration factor $CF_{EXCHANGER}$ in relation to the risk of further supersaturation and precipitation within the heat exchanger. Generally, the system concentration factor can be expressed as follows;

$$CF_{TOTAL} = CF_{BLOWDOWN} \cdot CF_{EXCHANGER}$$

The concentration which reaches steady state in the heated separator results from the steady removal of vapor in balance with a continuous blowdown from the heated separator. The value of the $CF_{TOTAL}$ is typically in the order of less than 5 to about 20 times, depending on the level and type of contaminates in the feed stream. Also depending on the level of vapor mass leaving the reboiler, the resulting $CF_{EXCHANGER}$ is determined (between 1.0 and 1.1) and the blowdown rate adjusted so that the desired concentration levels are not exceeded in the reboiler. A typical example can be shown as follows:

Feed stream contains 20,000 TDS, and it is desired not to exceed 100,000 TDS in the concentrate.

It is determined that the most effective mass ratio will be 20, resulting in a vapor fraction of 5%, from FIG. 7.

The $CF_{EXCHANGER}$ is located from FIG. 8 to be about 1.07. The $CF_{TOTAL}$ is calculated to be (100,000/20000)=5.

The $CF_{BLOWDOWN}$ is calculated to be (5/1.07)=4.7.

Therefore the corrected blowdown rate shall be (1/4.7)= 21% of the inlet feed stream.

Accordingly, by making use of a vapor recompression process in combination with a forced convection heat transfer system, and by following the steps of carefully selecting the ratio of mass flow of the circulating system to the vapor stream mass flow to be less than 300 to about 2, more specifically a ratio of about 10 to 100, selecting a heat flux of less than 6000 BTU $hr^{-1}$ $ft^{-2}$, and managing a blowdown stream to achieve the desired concentration effect (CF), the result is a very efficient water distillation unit which is not susceptible to fouling or scaling over long periods of operation. By combining the two known process schemes with a unique heat exchange configuration, and more particularly, designed with a specified concentrate circulation ratio not previously taught by prior art, allows the present invention to provide an effective method to distill water free of contaminants, without the risk of fouling and scaling.

The following examples serve to illustrate the invention.

EXAMPLE 1

This example calculation is a means of demonstrating the heat balance around the reboiler exchanger. This example represents a design basis of a distillation unit designed to recover 53,000 USGPD of clean distillate from a contaminated source.

| Exchanger Information | |
| --- | --- |
| Surface Area | 3,200 $ft^2$ |
| Type | Gasketed Plate-Frame |
| U | 542 BTU $hr^{-1}$ $ft^{-2}$ $F^{-1}$ |
| Corrected LMTD | 0.3340 F |
| Calculated Service Duty | (3,200)*(542)*(10.33), 17,908,217 $BTU^{-1}$ |
| Calculated Heat Flux | (17,908,217)/(3200) 5796 BTU $hr^{-1}$ $ft^{-2}$ |

| Condensing Side | |
| --- | --- |
| Inlet Conditions | 250 F @ 21.5 psia (superheated) |
| Outlet Conditions | 231.6 F @ 21.4 psia |
| Saturated Condensing Temperature | 231.8 F @ 21.5 psia |
| Latent Heat of Condensing | 957.6 BTU $lb^{-1}$ @ 21.5 psia |
| Steam Flow | 36.7 USgpm = 18,352 lb $hr^{-1}$ |
| $Q_{DESUPERHEAT}$ | (18,352)*(1.0)*(250 − 231.8) 334,006 BTU $hr^{-1}$ |
| $Q_{CONDENSE}$ | (17,908,217−334,006) 17,574,211 BTU $hr^{-1}$ |
| Calculated Flow | (17,574,211)/(957.6) 18,352 lb $hr^{-1}$ |

| Evaporating Side | |
| --- | --- |
| Inlet Conditions | 212.5 F @ 18.6 psia |
| Outlet Conditions | 213.2 F @ 16.1 psia |
| Latent Heat of Vaporization | 968.7 BTU $hr^{-1}$ @ 16.1 psia |
| Ratio of Circulated Mass to Vapor Mass | 10 |
| Concentrate Circulation Rate | 370 USgpm 184,926 lb $hr^{-1}$ |
| Vapor Flow | 18,352 lb $hr^{-1}$ |
| Percent Vapor | (18,352/184,926) = 10% |
| $Q_{EVAPORATE}$ | (18,352)*(968.7) 17,778,769 BTU $hr^{-1}$ |
| $Q_{SENSIBLE}$ | (184,926)*(1.0)*(213.2 − 212.5) 129,448 BTU $hr^{-1}$ |
| $Q_{TOTAL}$ | (17,775,747) + (129,448) 17,908,217 BTU $hr^{-1}$ |

This example illustrates that the 10% vapor fraction created in the circulating fluid will capture 99% of the heat transferred from the condensing side and increase the circulating fluid temperature by less than 1 F., even though there is 10 times the mass of circulating liquid.

EXAMPLE 2

A prototype unit was fabricated designed to recover 10,000 USgpd of clean distillate from a landfill leachate lagoon. The unit was tested over an extended period and detailed performance test data was collected during this period. The pilot operated successfully for an extended 4 month period and upon inspection fouling was negligible in the reboiler and heated separator. The equipment used at the pilot test included a Spencer™ Model GF36204E Blower Compressor providing a 3.0 psi differential pressure. Standard single pass, plate-frame heat exchangers were used during the test.

The leachate feed, concentrated blowdown, and treated effluent characteristics were as follows:

| Parameter | Units | Leachate Feed[2] | Blowdown approx 10%[2] | Treated Effluent[2] |
| --- | --- | --- | --- | --- |
| BOD | mg $l^{-1}$ | 26 | 88 | <10 |
| COD | mg $l^{-1}$ | 277 | 1,207 | 11 |
| TOC | mg $l^{-1}$ | 59 | 549 | 6 |
| TSS | mg $l^{-1}$ | 33 | 145 | <2 |
| VSS | mg $l^{-1}$ | 15 | 29 | <2 |
| TDS | mg $l^{-1}$ | 5,473 | 53,000 | <50 |
| Calcium | mg $l^{-1}$ | 96 | 435 | <0.05 |
| Magnesium | mg $l^{-1}$ | 228 | 1,990 | <0.05 |
| Sodium | mg $l^{-1}$ | 550 | 4,650 | <2 |
| Iron | mg $l^{-1}$ | 5 | 469 | .6 |
| Total P | mg $l^{-1}$ | 1.5 | 1.5 | <0.01 |
| Ammonia as N | mg $l^{-1}$ | 53 | 124 | 0.38[1] |
| Total Alkalinity As CaCO3 | $mg^{-1}$ | 2,353 | 2,930 | 1 |
| Chlorides | mg $l^{-1}$ | 217 | 784 | 0.2 |
| Sulfates | mg $l^{-1}$ | 350 | 20,000 | <2 |
| Total Phenois | mg $l^{-1}$ | 0.08 | 0.45 | .017 |
| Total Coliform | Col/100 cc | 673 | <3 | 0 |
| Colour | TCU | 166 | 800 | <5 |
| Turbidity | NTU | 131 | 220 | 0.1 |

Note [1]pH pretreatment adjustment to control ammonia
Note [2]values are shown as average values over the test period.

Figure 9:
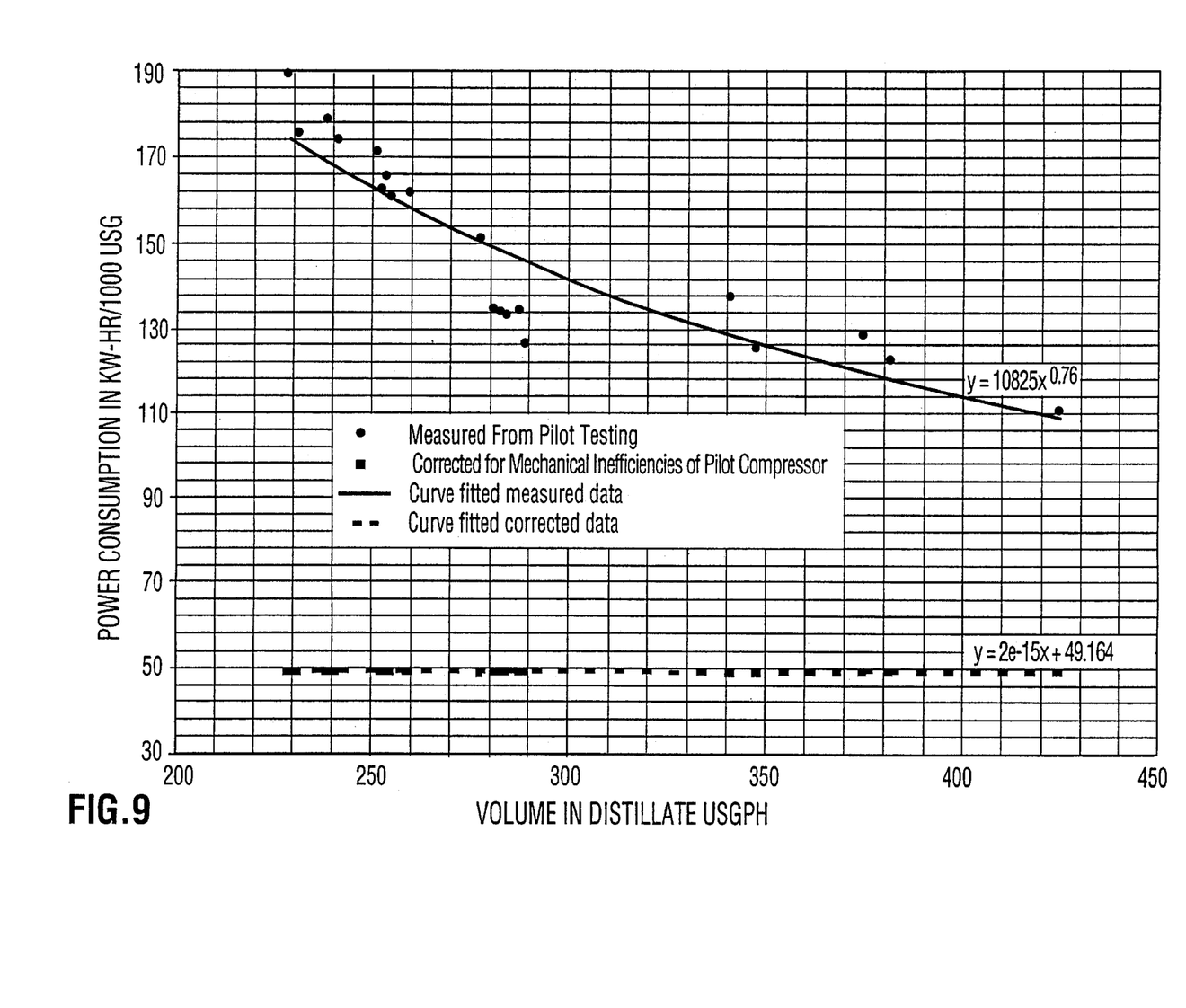
FIG. 9 is a chart showing the test data obtained from a distillation unit pilot.

The effluent is of such quality that it can be discharged to the surface water bodies exceeding virtually all regulatory guidelines. The compressor power consumption was measured and recorded for various performance points, including compressor turndown and recycle conditions. The measured power consumption was plotted on FIG. 9 as power consumption per 1,000 USgal for the various distillate flows. The test data curve was corrected for the compressor inefficiencies over the range of flows and a uniform power consumption value of 50 KW-hr/1000 USgal was derived. Allowing for standard compressor efficiencies of about 77%, the required power consumption for the high efficiency distillation unit is about 65 KW-hr/1000 USgal. The blowdown stream averaged about 10% of the feed stream throughout the test period, resulting in 4 average concentration factor (CF) of 10. A visual inspection was completed after the testing, showing no signs of scaling in the heated separator and reboiler equipment.

In terms of the apparatus employable in the system it will be readily appreciated by those skilled in the art as to what examples of the heated separators, preheaters, reboiler, pumps, compressors/blowers, etc., will be most desirable. Other modifications will be readily appreciated without departing from the scope of the invention.

Although the embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of removing contaminants from a water feed stream containing contaminants by combining vapor compression and a forced circulation circuit, comprising the steps of:
   preheating a water feed stream in a first step to at least partially remove some of said contaminants from said waterfeed stream and recover energy from a concentrate and distillate;
   heating the preheated water feed stream in a second heating step in a heated separator to generate a vapor fraction and a concentrate liquid contaminant fraction;
   compressing said vapor fraction to generate a temperature differential in a reboiler exchanger;
   controlling the temperature differential within said reboiler exchanger and the concentrate temperature to maintain nucleate boiling whereby a wetted surface is maintained within said reboiler exchanger;
   circulating at least a portion of said concentrate through said reboiler exchanger and said heated separator;

maintaining a ratio of circulating mass to vapor mass of between 300 and 2 to maintain wetted surfaces on heated surfaces of said heated separator and said reboiler exchanger for reducing scale formation and fouling said ratio resulting in a vapor fraction of between 1% and 50% by mass vapor exiting said reboiler exchanger;

condensing the vapor fraction and collecting a distillate; and removing at least a portion of said concentrate from said reboiler to reduce the level of said contaminants.

2. The method as set forth in claim 1, wherein said water feed stream is subjected to a pretreatment protocol prior to said preheating.

3. The method as set forth in claim 2, wherein said pretreatment protocol is selected from the group consisting of filtration, ion exchange, distillation, precipitation and evaporation.

4. The method as set forth in claim 1, wherein said temperature of said vapor fraction subsequent to compression is greater than the temperature of said vapor fraction in said heated separator.

5. The method as set forth in claim 1, further including the step of subjecting said condensed vapor to post-treatment protocol.

6. The method as set forth in claim 5, wherein said post-treatment protocol is selected from the group consisting of filtration, ion exchange, distillation, precipitation and evaporation.

7. The method as set forth in claim 6, further including the step of recirculating the distillate to said first step of preheating.

8. The method as set forth in claim 1, subsequent to step of controlling the temperature differential, further including the steps of:

a) supersaturating said concentrate to precipitate solid;

b) filtering said concentrate; and c) recovering said solid.

9. A method of removing contaminants from a water feed stream containing volatilizable and nonvolatilizable contaminants by combining vapor compression and a forced circulation circuit, comprising the steps of:

preheating a water feed stream in a first step to at least partially remove some of said contaminants from said water feed stream and recover energy from a concentrate and distillate;

heating the preheated water feed stream in a second heating step in a heated separator to generate a vapor fraction and a concentrate liquid contaminant fraction;

passing said vapor fraction through a distillation column while in contact with distillate reflux;

compressing said vapor fraction to generate a temperature differential in a reboiler exchanger;

condensing said vapor fraction in said reboiler exchanger to form a distillate;

recirculating a portion of said distillate to said distillation column as the distillate reflux;

circulating at least a portion of said concentrate through said reboiler exchanger and said heated separator;

maintaining a ratio of circulating mass to vapor mass of between 300 and 2 to maintain wetted surfaces on heated surfaces of said heated separator and said reboiler exchanger for reducing scale formation and fouling said ratio resulting in a vapor fraction of between 1% and 50% by mass vapor exiting said reboiler exchanger; and collecting distillate substantially devoid of said contaminants.

10. A method of removing contaminants from a water feed stream containing contaminants by combining a vapor compression and forced circulation circuit, comprising the steps of:

preheating a water feed stream in a first step to at least partially remove some of said contaminants from said water feed stream and recover energy from a concentrate and distillate;

heating the preheated water feed stream in a second heating step in a heated separator to generate a vapor fraction and a concentrate liquid contaminant fraction;

compressing said vapor fraction to generate a temperature differential in a reboiler exchanger;

condensing said vapor fraction in said reboiler exchanger to form a distillate;

supersaturating said concentrate to precipitate a solid;

filtering said concentrate;

recovering said solid;

circulating at least a portion of said concentrate through said reboiler exchanger and said heated separator;

maintaining a ratio of circulating mass to vapor mass of between 300 and 2 to maintain wetted surfaces on heated surfaces of said heated separator and said reboiler exchanger for reducing scale formation and fouling;

recirculating the distillate to the step of preheating; and collecting distillate substantially devoid of contaminants.

11. The method as set forth in claim 10, further including the step of subjecting said condensed vapor to post-treatment protocol.

12. The method as set forth in claim 11, wherein said post-treatment protocol is selected from the group consisting of filtration, ion exchange, distillation, precipitation and evaporation.

* * * * *